United States Patent [19]

Chamzas

[11] Patent Number: 4,873,577
[45] Date of Patent: Oct. 10, 1989

[54] EDGE DECOMPOSITION FOR THE TRANSMISSION OF HIGH RESOLUTION FACSIMILE IMAGES

[75] Inventor: Christodoulos Chamzas, West Long Branch, N.J.

[73] Assignees: American Telephone and Telegraph Company, New York, N.Y.; AT&T Bell Laboratories, Murray Hill, N.J.

[21] Appl. No.: 146,917

[22] Filed: Jan. 22, 1988

[51] Int. Cl.$^4$ .......................... H04N 1/415; H04N 1/40
[52] U.S. Cl. .................................... 358/426; 358/133; 358/447
[58] Field of Search ..................... 358/133, 260, 261.1, 358/261.2, 261.3, 261.4, 280, 282, 284

[56] References Cited

U.S. PATENT DOCUMENTS

| | | | |
|---|---|---|---|
| 4,222,076 | 9/1980 | Knowlton | 358/263 |
| 4,261,018 | 4/1981 | Knowlton | 358/263 |
| 4,280,144 | 7/1981 | Bacon | 358/280 |
| 4,356,555 | 10/1982 | Ejiri et al. | 358/284 |
| 4,360,883 | 11/1982 | Ejiri et al. | 358/284 |
| 4,365,273 | 12/1982 | Yamada et al. | 358/133 |
| 4,366,506 | 12/1982 | Ejiri et al. | 358/133 |
| 4,414,580 | 11/1983 | Johnsen et al. | 358/260 |
| 4,656,664 | 4/1987 | Anderson et al. | 382/47 |
| 4,751,585 | 6/1988 | Shibazaki | 358/280 |

FOREIGN PATENT DOCUMENTS 55-124363  9/1980  Japan ..................................... 358/260

OTHER PUBLICATIONS

"Line-Preserving Binary Image Reduction Algorithm", ISO/TC97/SC2/WG8, N 601 Rev O, dated Oct. 29, 1987.

G. G. Langdon, Jr., et al., "Compression of Black--White Images with Arithmetic Coding", IEEE Transactions on Communications, vol. COM-29, No. 6, Jun. 1981, pp. 858–867.

"Fascimile Coding Schemes and Coding Control Functions for Group 4 Facsimile Apparatus", Internatinal Telephone and Telegraph Consulatative Committee (CCITT), Redbook, Fasicle VII. 3, pp. 40–48.

T. Endoh et al., "Progressive Coding Scheme for Interactive Image Communications", IEEE Communication Society Global Telecommunications Conference, Nov. 26-29, 1984, pp. 1426–1433.

"Progressive Coding Scheme" (PCS), ISO/TC97/SC2/WG8, dated Jun. 1987.

Primary Examiner—Edward L. Coles, Sr.
Assistant Examiner—Randall S. Svihla
Attorney, Agent, or Firm—Thomas Stafford

[57] ABSTRACT

A high resolution image is decomposed into a low resolution replica and into corresponding supplemental information for facsimile transmission to a remote location. The low resolution replica is generated by replacing a super pixel (picture element) including a plurality of high resolution image pixels with a single low resolution pixel and corresponding supplemental information, if any is required. The pixels of the low resolution replica are chosen such that all supplemental information required to convert the low resolution replica back to the original high resolution image is located at the "edges" of the low resolution replica. Thus, if a low resolution pixel is at an edge in the low resolution pixel is at an edge in the low resolution replica, supplemental information is generated in accordance with prescribed criteria. In a remote receiver, the decomposition is reversed and the original high resolution image is recomposed by substituting the transmitted supplemental information, if any, for the corresponding low resolution pixels located at the edges of the low resolution replica.

21 Claims, 5 Drawing Sheets

EDGE DECOMPOSITION FOR THE TRANSMISSION OF HIGH RESOLUTION FACSIMILE IMAGES

CROSS-REFERENCE TO RELATED APPLICATIONS

U.S. patent application Ser. No. 146,998 was filed concurrently herewith.

TECHNICAL FIELD

This invention relates to the digital transmission of information and, more particularly, to the digital transmission of two-tone (black and white) images through facsimile.

BACKGROUND OF THE INVENTION

In a rapidly shrinking business world, use of facsimile transmission of documents and the like is increasing at a rapid rate worldwide. The introduction of digital networks and the use of high resolution monitors for soft copy and browsing have added additional requirements to the facsimile world. A number of arrangements have been proposed for enhancing received two-tone images in order to increase their resolution. For the most part, these arrangements have employed progressive coding schemes. In one particular facsimile progressive coding scheme, the image information to be transmitted is separated into so-called low resolution information and supplemental information. In this prior facsimile scheme, the low resolution information is based on a subsampling technique of the original image and the supplemental information is transmitted by employing a predictive encoding scheme based on the adjacent transmitted pixels (picture elements) of the image. One such prior progressive coding scheme is described in an article entitled "Progressive Coding Scheme for Interactive Image Communications", by T. Endoh and Y. Yamazaki, in *IEEE Communications Society, Global Communications Conference*, Nov. 26–29, 1984, pages 1426 through 1433.

A disadvantage of this prior facsimile progressive coding scheme is that excessive information is required to be transmitted when an image includes no information, for example, when an image has large areas of a single tone (i.e., either white or black). Other facsimile image coding schemes avoid this problem, e.g., see U.S. Pat. No. 4,261,018 issued to K. C. Knowlton on Apr. 7, 1981 by using some form of pyramidal data structure. However, such prior schemes require storing of the entire image to be transmitted and, consequently, require large memory. Additionally, such prior schemes are incompatible with the line-by-line coders which have been proposed as the standard for conventional digital facsimile transmission.

SUMMARY OF THE INVENTION

The problems associated with prior two-tone image facsimile transmission arrangements are overcome, in accordance with an aspect of the invention, in order to transmit a high resolution two-tone image by efficiently decomposing the original image into a low resolution replica of the high resolution image, called also the essential information portion, and into a supplemental information portion. The supplemental information portion is the information required to convert the low resolution replica back into the original high resolution image. The low resolution replica is created by replacing a so-called super pixel, which includes a plurality of high resolution pixels in the original high resolution image with a single low resolution pixel and corresponding supplemental information, if any is required. The low resolution replica is generated in such a way that the supplemental information, if any, for a low resolution pixel is at prescribed locations defined as so-called "edges". A low resolution pixel is determined to be located at an "edge" in accordance with prescribed criteria. Specifically, the low resolution pixel is at an edge, in this example, if either an adjacent low resolution pixel before it on the same line or an adjacent low resolution pixel above it in a previous line is of a different tone. The tone of the low resolution pixel determined to be at an edge is selected in accordance with prescribed criteria dependent on the relationship of the tones of predetermined other low resolution pixels adjacent to it and on the tones of the high resolution pixels in its corresponding super pixel. If it is determined that supplemental information is required for a low resolution pixel not located at an edge, its tone is selected so that the low resolution pixel is at an edge. In this example, this is effected if the adjacent low resolution pixels have the same tone and any one or more of the high resolution pixels in the super pixel has a tone different from the adjacent low resolution pixels. Supplemental information for a low resolution pixel in the low resolution replica is generated and transmitted only if the low resolution pixel is at an "edge".

In a receiver, the decomposition is reversed and the original high resolution image is recomposed by substituting the transmitted supplemental information, if any, for the corresponding low resolution pixels located at edges in the low resolution replica defined by the essential information.

DETAILED DESCRIPTION

Figure 1:
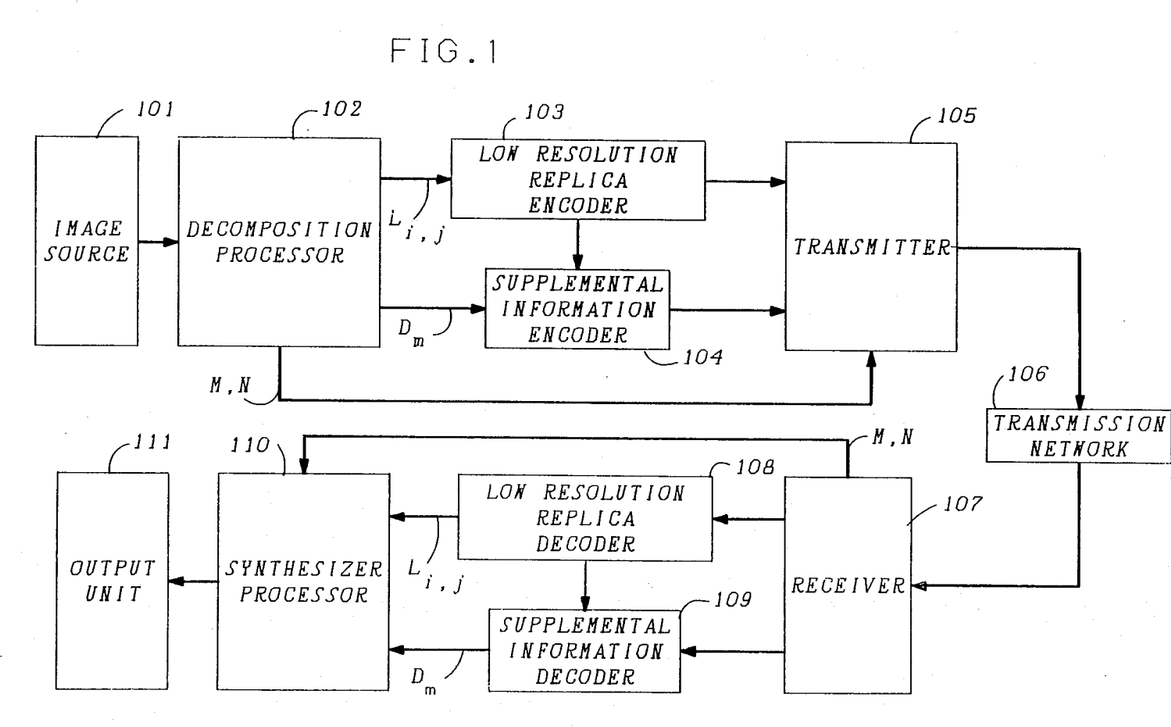
FIG. 1 shows in simplified block diagram form a facsimile transmission system incorporating the invention.

FIG. 1 shows in simplified block diagram form a facsimile transmission system including an embodiment of the invention. Accordingly, shown are image source 101, decomposition processor 102, low resolution replica encoder 103, supplemental information encoder 104, transmitter 105, transmission network 106, receiver 107, low resolution replica decoder 108, supplemental information decoder 109, synthesizer processor 110 and output unit 111.

Image source 101 provides, in this example, a desired high resolution image and may be, for example, either a scanner or a data base. One such scanner which may advantageously be employed is manufactured by Canon and is designated laser copier scanner NP-9030. The images to be transmitted may also be stored in a data base on, for example, either a magnetic disc or an optical disc, e.g., Optimum 1000. In this example, not to be construed as limiting the scope of the invention, the high resolution image includes 400 dots per inch and has M columns (pixels/line) and N lines and includes M×N pixels. A so-called super pixel includes a block of "a×b" high resolution pixels. Although any desired number of high resolution pixels from a plurality of columns and lines may be grouped to form a super pixel, in this example, it has been convenient to group four (4) adjacent high resolution pixels into a super pixel. Thus, a super pixel includes a block (a=b=2) of four high resolution pixels, namely, $S_{k,n}, S_{k+1,n}, S_{k,n+1}, S_{k+1,n+1}$ (k is the line index and n is the column index). If M and N are not integer multiples of a and b, respectively, then a number of imaginary columns and/or lines are appended so that the above condition is satisfied. In this example, when the Canon scanner is employed to scan the original image, at 400 dots per inch, it yields M=3456 columns and N=4672 lines for an A4 standard size document.

Decomposition processor 102 decomposes the high resolution image from image source 101, in accordance with an aspect of the invention, into a low resolution replica (essential information) and supplemental information. Specifically, decomposition processor 102 supplies low resolution pixels $L_{i,j}$ to low resolution replica encoder 103 and supplemental information $D_m$ to supplemental encoder 104. Decomposition processor 102 first creates the low resolution replica of the original image, which in this example, is a two-tone image including 200 dots per inch. This is realized by replacing every super pixel of the original high resolution image with one low resolution pixel in the low resolution replica. The difference between the original high resolution image and the low resolution replica is the supplemental information required to convert the low resolution replica into the desired original high resolution image.

Figure 2:
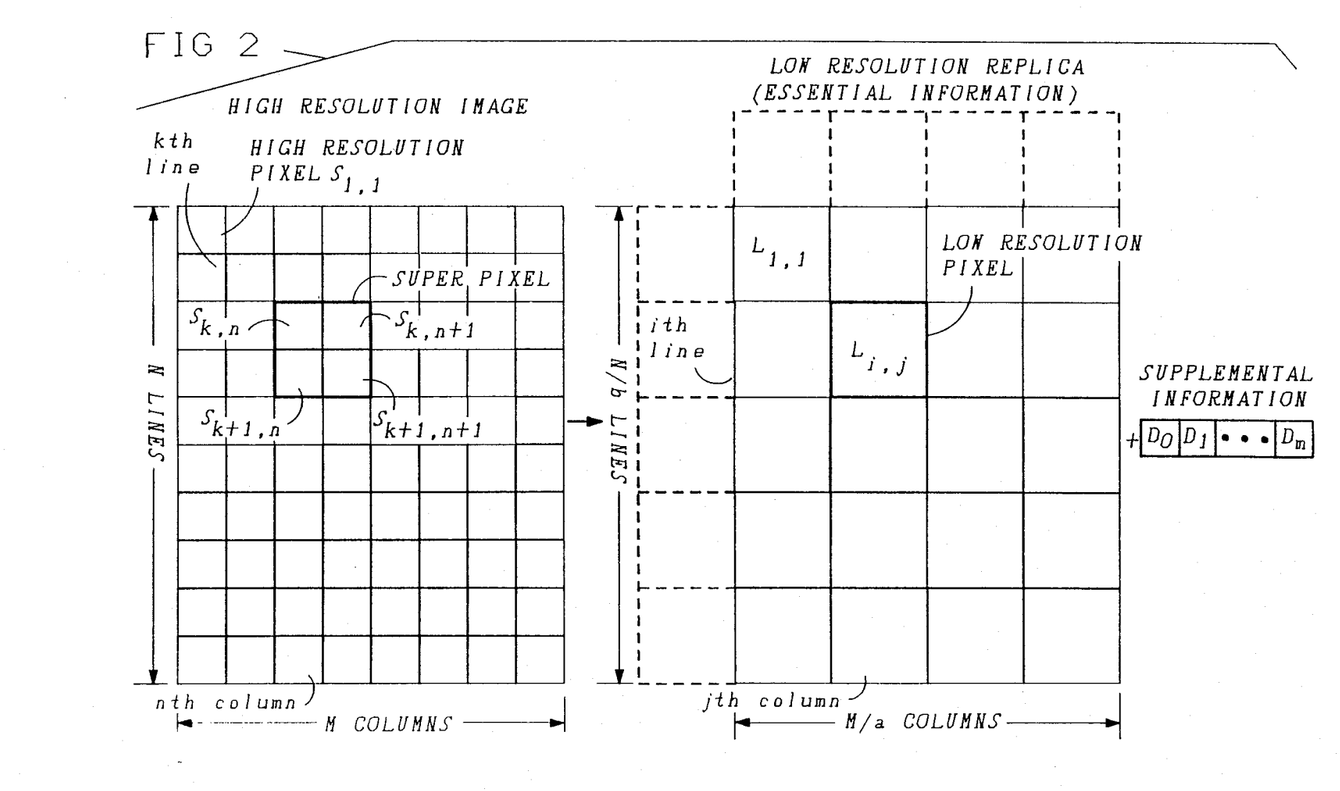
FIG. 2 depicts in graphic form a high resolution image which is decomposed by use of the invention into a low resolution replica plus supplemental information and being useful in describing the invention.

Thus, FIG. 2 shows a simplified high resolution image having M columns and N lines, forming M×N high resolution pixels and a simplified low resolution replica having M/a columns and N/b lines plus supplemental information. As indicated above, the Canon scanner, in this example, would generate M=3456 columns and N=4672 lines for an A4 standard size document. The high resolution image is divided into so-called super pixels, each of which includes a plurality of high resolution image pixels. Although any desired number of high resolution pixels from a plurality of lines and columns may be grouped to form a super pixel, in this example, it has been convenient to group four high resolution image pixels into a super pixel. Thus, in this example, a super pixel includes high resolution image pixels $S_{k,n}, S_{k,n+1}, S_{k+1,n}$ and $S_{k+1,n+1}$. As indicated above, the high resolution image is decomposed into a low resolution replica (essential information portion) and supplemental information. To this end, each super pixel in the high resolution image is replaced by a single pixel $L_{i,j}$ (i,j are the indices of the lines and columns respectively in the low resolution replica) in the low resolution replica and supplemental information for the low resolution pixel, in accordance with an aspect of the invention, when it is at an "edge" in the low resolution replica. The generation of the supplemental information for low resolution pixels at "edges" in the low resolution replica is explained hereinafter. The low resolution replica is assumed to have an imaginary reference line of low resolution pixels above its first line and an imaginary reference column of low resolution pixels before its first column. In this example, for simplicity, these reference lines are chosen to be white.

Figure 3:
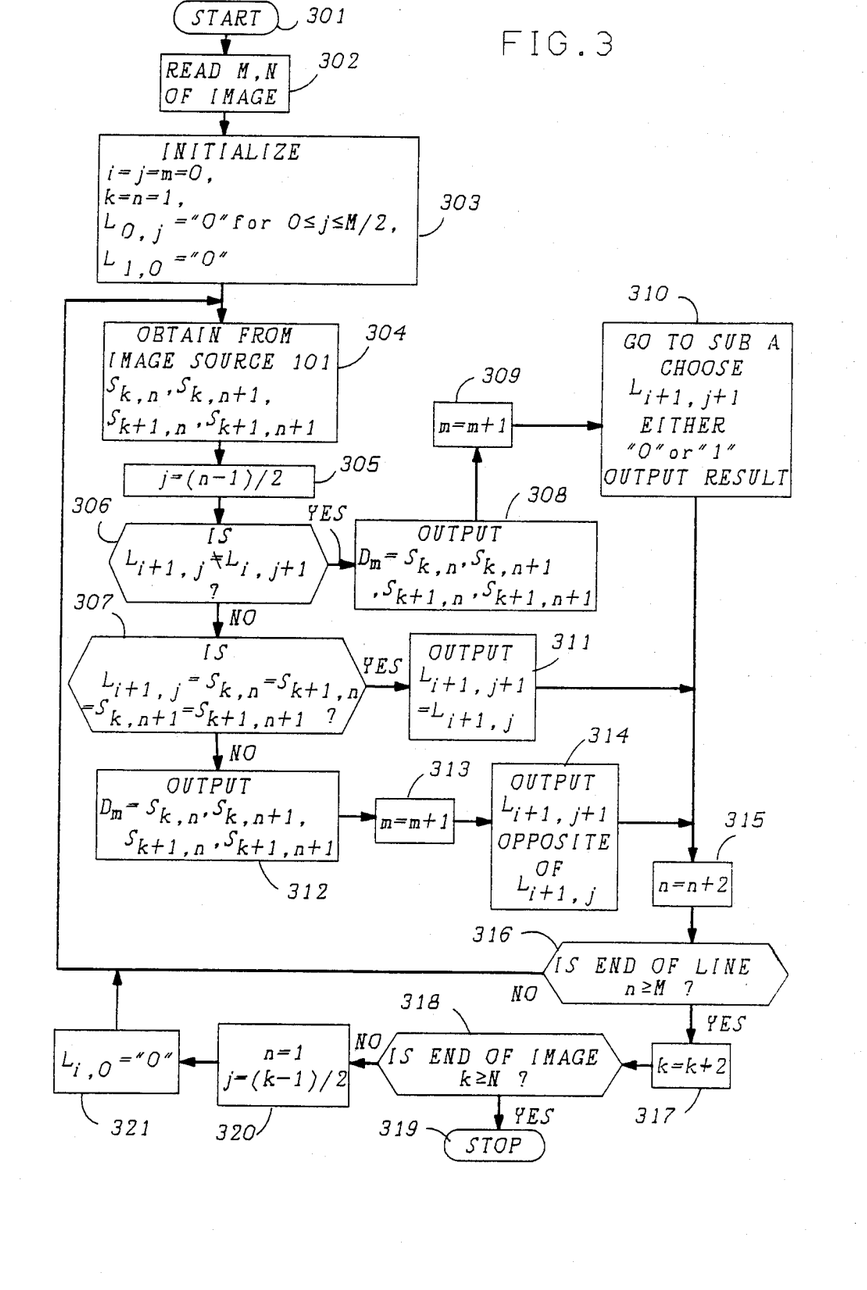
FIG. 3 illustrates a flow chart of the decomposition process employed in the system of FIG. 1.
Figure 4:
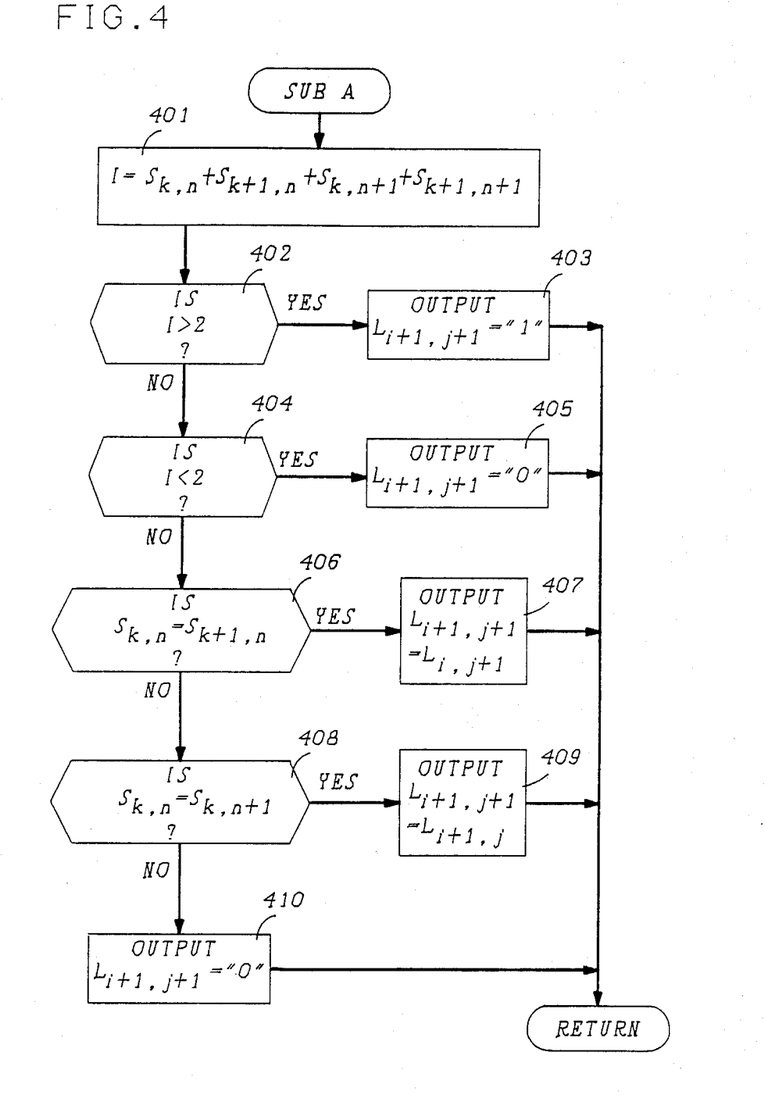
FIG. 4 depicts a flow chart of a subprocess (SUB A) used to select the tone of the supplemental information generated in the flow chart of FIG. 3.

The operation of the decomposition processor 102 in effecting the desired decomposition into the low resolution replica is shown in the flow chart of FIG. 3. Accordingly, the decomposition process is entered via start step 301. Thereafter, operational block 302 causes the number of columns M and lines N to be obtained from image source 101. Then, operational block 303 causes the initialization of decomposition processor 102 by setting i=j=m=0, k=n=1, $L_{0,j}$="0" for $0 \leq j \leq M/2$, and $L_{1,0}$="0", where "0" is a logical 0 and represents a white tone. Conversely, "1" represents a black tone and is a logical 1. Operational block 304 obtains from image source 101 the nth and (n+1)th pixels from the kth and (k+1)th lines of the original high resolution image. This represents a super pixel (a=b=2) in the original high resolution image (FIG. 2) which is to be decomposed into a single low resolution pixel in the low resolution replica plus any supplemental information (FIG. 2) that is required. Operational block 305 sets column index j in the low resolution replica to j=(n−1)/2. Conditional branch point 306 tests to determine whether the current low resolution pixel is located on an "edge" in the low resolution replica. The current low resolution pixel is defined as $L_{i+1,j+1}$. Since for the first pass-through the process i=j=0, the first current low resolution pixel is $L_{1,1}$. The test of step 306 is effected by comparing the previous low resolution pixel $L_{i+1,j}$ on the same line as the current low resolution pixel to the pixel above the current low resolution pixel on the previous line, namely, $L_{i,j+1}$. Thus, if $L_{i+1,j}=L_{i,j+1}$, the test result is NO and control is transferred to conditional branch point 307 where further testing is done to determine whether or not supplemental information must be generated for the current low resolution pixel. If the test result in step 306 is YES, $L_{i+1,j} \neq L_{i,j+1}$ and the current low resolution pixel $L_{i+1,j+1}$ is at an edge. Consequently, $D_m$ needs to be generated for the current low resolution pixel. Accordingly, operational block 308 generates supplemental information $D_m$ for the current low resolution pixel. Since in this example, the super pixel includes four two-tone high resolution pixels, there are sixteen possible combinations. Supplemental information $D_m$ determines which one of the sixteen possible combinations is the current super pixel. Thus, step 308 generates $D_m=S_{k,n}, S_{k,n+1}, S_{k+1,n}, S_{k+1,n+1}$, which yields a binary number depending on the tones included in the plurality of high resolution pixels of the current super pixel. By way of an example, if $S_{k,n}$ is white, $S_{k,n+1}$ is black, $S_{k+1,n}$ is white and $S_{k+1,n+1}$ is black and, since white is a logical 0 and black is a logical 1, $D_m$=0101 (binary). Operational block 309 increments the supplemental information counter, m=m+1. Operational block 310 chooses the tone of the current low resolution pixel, $L_{i+1,j+1}$. A particular subprocess (SUB A) for selecting the tone of the current low resolution pixel is shown in FIG. 4 and will be described later. Let us now return to step 307. Step 307 effectively determines if the tone of the previous low resolution pixel on the same line as the current low resolution pixel is the same as all the tones of the high resolution pixels in the current super pixel. If the tones of the high resolution pixels of the current super pixel corresponding to the current low resolution pixel are all the same, the test result of step 307 is YES and there is no need to generate supplemental information for the current low resolution pixel. Thereafter, operational block 311 sets the tone of the current low resolution pixel to be the same as the tone of the previous low resolution pixel on the same line as the current low resolution pixel, i.e., $L_{i+1,j+1}=L_{i+1,j}$. If the test result in step 307 is NO, supplemental information is required to be generated for the current low resolution pixel. Therefore, operational block 312 generates supplemental information $D_m$ for the current low resolution pixel in the same manner as step 308 described above. Thereafter, operational block 313 causes the supplemental information counter to be incremented, $m=m+1$. Operational block 314 causes the tone of the current low resolution pixel to be the opposite of the tone of the previous low resolution pixel on the same line as the current low resolution pixel and thereby causes the current low resolution pixel to be at an edge.

In summary, steps 304 through 314 are employed, in accordance with an aspect of the invention, to decompose a super pixel in a high resolution image including a plurality of high resolution pixels, in this example, 4 high resolution pixels, arranged in a so-called 2-by-2 configuration (FIG. 2), into a single low resolution pixel in the low resolution replica plus supplemental information, if any is required.

Operational block 315 increments the column counter for the high resolution image by 2, namely, $n=n+2$, to go on to the next super pixel. Conditional branch point 316 tests to determine if the last column in a line (end of line) has been reached, namely, $n \geq M$. If the test result is NO, the last column has not been reached and control is returned to operational block 304 and steps 304 through 315 are iterated for the next super pixel in the high resolution image. If the test result in step 316 is YES, the last column has been reached and operational block 317 increments the line counter by 2, namely, setting $k=k+2$. Conditional branch point 313 tests to determine if the end of image has been reached, namely, if $k \geq N$. If the test result is YES, the process is stopped via step 319. If the test result in step 318 is NO, operational block 320 sets the high resolution column counter to $n=1$, and the low resolution line counter $i=(k-1)/2$. Thereafter, operational block 321 initializes the pixel in the low resolution replica to a white tone, namely, $L_{i,0}="0"$. Thereafter, control is returned to operational block 304 and the process is iterated until the image is completed and step 318 yields a YES result.

FIG. 4 is a flow chart describing the operation of SUB A used in step 310 of FIG. 3 to choose the tone of the current low resolution pixel. Accordingly, operational block 401 counts the number of a predetermined tone, in this example, black, that is included in the high resolution pixels of a super pixel. To this end, parameter I is set equal to the number of black pixels present in the current super pixel, i.e., $I=S_{k,n}+S_{k+1,n}+S_{k,n+1}+S_{k+1,n+1}$. Thereafter, conditional branch point 402 tests to determine whether the number of high resolution pixels with black tone in the current super pixel is greater than half of the high resolution pixels in the super pixel. Since in this example the super pixel includes four high resolution pixels, step 402 tests to determine whether $I>2$. If the test result is YES, operational block 403 sets the tone of the current pixel in the low resolution replica to black and a logical 1 is outputted for $L_{i+1,j+1}$. If the test result in step 402 is NO, conditional branch point 404 tests to determine if the number of high resolution pixels in the current super pixel which are black tone is less than half of the high resolution pixels in the current super pixel. In this example, step 404 tests whether $I<2$. If the test result is YES, operational block 405 causes the current low resolution pixel to include a white tone and a logical 0 is outputted. If the test result in step 404 is NO ($I=2$), conditional branch point 406 tests to determine if $S_{k,n}=S_{k+1,n}$, which would indicate that two high resolution pixels in a column of the super pixel include black tone. If the test result is YES, the tone of the current low resolution pixel is set to be equal to that of the low resolution pixel in the previous line above the current low resolution pixel. If the test result in step 406 is NO, conditional branch point 408 tests to determine if two high resolution pixels in the same line of the super pixel include black tone. If the test result is YES, operational block 409 causes the tone of the current low resolution pixel to be set to that of the previous low resolution pixel in the same line as the current low resolution pixel. If the test result in step 408 is NO, operational block 410 causes the current low resolution pixel to include white tone and a logical 0 is outputted.

Decomposition processor 102 can be implemented either in software for use in a processor, e.g., a digital signal processor, or on a VLSI chip or the like, as desired.

Low resolution replica encoder 103 of FIG. 1 is employed to encode the low resolution pixels, i.e., essential information, in well-known fashion. Specifically, any one of several known CCITT standard encoding techniques may be employed. Preferably, the encoding technique utilized is the one described in International Telephone and Telegraph Consultative Committee (CCITT), "Facsimile Coding Schemes and Coding Control Functions for Group IV Facsimile Apparatus", Redbook, Fasicle VII.3, Rec. T.6, 1984, pp. 40–48. The purpose of using the preferred encoding scheme for the low resolution replica essential information is to maintain compatibility with existing facsimile transmission equipment. The encoded information is supplied from encoder 103 to transmitter 105.

Supplemental information encoder 104 is employed to encode the supplemental information, if any, corresponding to the essential low resolution replica information for the current low resolution replica pixel being encoded in encoder 103. The particular encoding scheme for the supplemental information used in encoder 104 is somewhat dependent upon the particular application to which the decomposition process is going to be employed. For example, if the decomposition process is to be employed in a progressive encoding arrangement, an arithmetic coder can be advantageously employed. One such encoder arrangement is disclosed in an article entitled "Compression of Black-White Images with Arithmetic Coding", *IEEE Transactions on Communications*, Vol. COM-29, No. 6, Jun. 1981, pp. 858–867. The encoded supplemental information is supplied from encoder 104 to transmitter 105.

Transmitter 105 may be any of several alternatives, also depending on the application of the decomposition process of this invention. Transmitter 105 supplies the information to be transmitted to transmission network 106. Transmission network 106 may be, for example, a wideband packet transmission network or an integrated services digital network (ISDN) or any desired network. The transmitted information is supplied to receiver 107 in a remote location. Receiver 107 is compatible with transmitter 105. Receiver 107 supplies the received low resolution replica pixels to low resolution replica decoder 108 and the received supplemental information to supplemental information decoder 109. Decoder 108 is compatible with encoder 103 and decoder 109 is compatible with encoder 104. Low resolution replica decoder 108 supplies the low resolution pixels for the low resolution replica, i.e., the essential information, to synthesizer processor 110. Similarly, supplemental information decoder 109 supplies the supplemental information, if any, for the low resolution pixels to synthesizer processor 110.

Synthesizer processor 110, in response to the low resolution pixels and the corresponding supplemental information, if any, operates to reconstruct, in accordance with an aspect of the invention, the original high resolution image supplied from image source 101.

Figure 5:
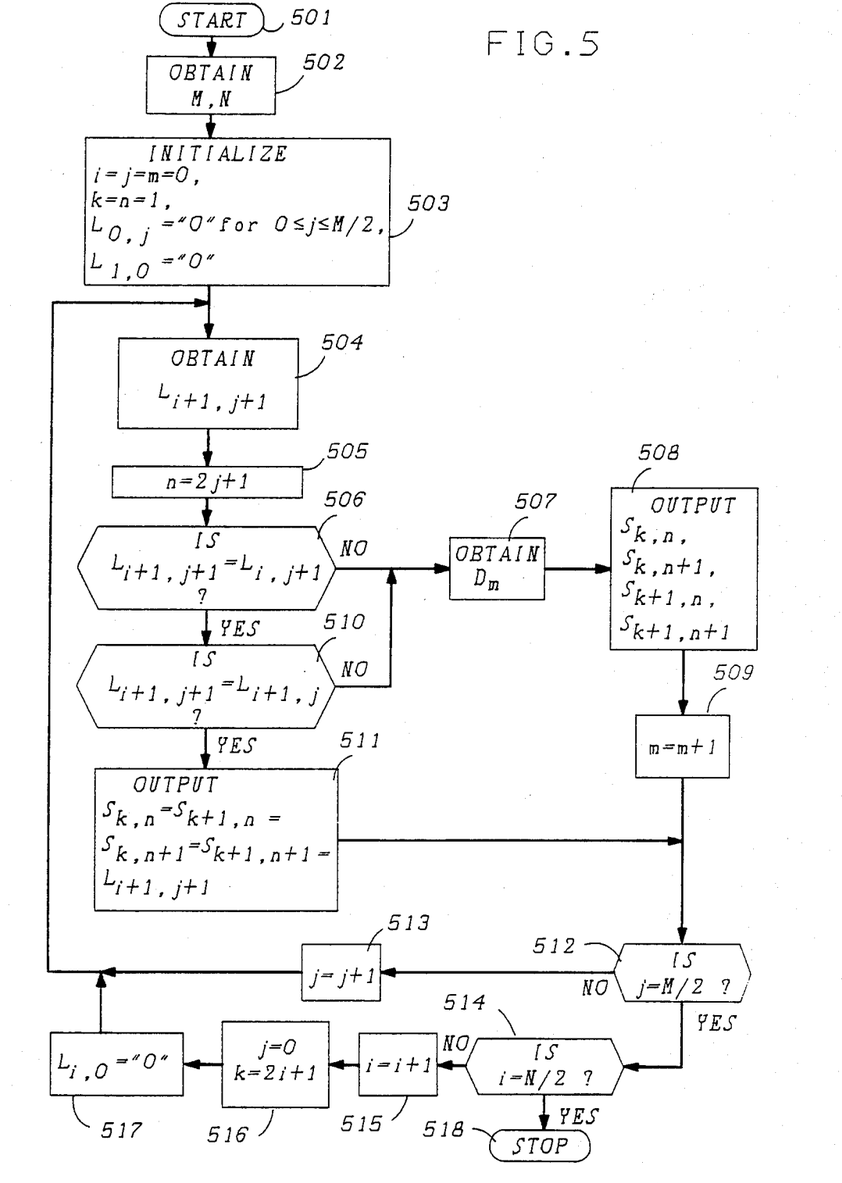
FIG. 5 shows a flow chart of a synthesizer scheme employed in recomposing the original image at the receiver.

FIG. 5 is a flow chart describing the operation of synthesizer processor 110 in generating the high resolution image. To this end, the process is entered by start step 501. Thereafter, operational block 502 obtains the number M of the columns and the number N of the lines in the original high resolution image. This information is obtained from receiver 107 from overhead bits or the like in the transmitted signal in well-known fashion. Operational block 503 initializes synthesizer processor 110. Specifically, $i=j=m=0$, $k=n=1$, $L_{0,j}=$"0" for $0 \leq j \leq M/2$ and $L_{1,0}=$"0". Operational block 504 causes a current low resolution pixel $L_{i+1,j+1}$ to be read from decoder 108. Operational block 505 causes the high resolution column counter to be set to a specific value, namely, $n=2j+1$. Conditional branch point 506 tests to determine whether the tone of the current low resolution pixel is equal to the tone of the low resolution pixel above it in the previous line, namely, whether $L_{i+1,j+1}=L_{i,j+1}$. If the test result in step 506 is NO, then the current low resolution pixel is at an edge in the low resolution replica and operational block 507 causes the supplemental information $D_m$ to be read from decoder 109. As indicated above, $D_m$ represents one of the sixteen possible combinations for the current super pixel which is to replace the current low resolution pixel. Accordingly, operational block 508 causes the tones of the high resolution pixels in the current super pixel to be generated and outputted, namely, the tones of $S_{k,n}, S_{k,n+1}, S_{k+1,n}$ and $S_{k+1,n+1}$. Operational block 509 causes the supplemental information counter to be incremented by 1, namely, setting $m=m+1$ and control is transferred to conditional branch point 512. Returning to step 506, if the test result is YES, conditional branch point 510 tests to determine whether the current low resolution pixel has the same tone as the previous low resolution pixel on the same line, namely, whether $L_{i+1,j+1}=L_{i+1,j}$. If the test result is NO, the current low resolution pixel is at an edge in the low resolution replica and the supplemental information for generating the tones of the high resolution pixels to be substituted for the low resolution pixel is obtained and outputted via steps 507 and 508, respectively, and steps 509 and 512 are repeated, as described above. If the test result in step 510 is YES, the current low resolution pixel is not at an edge in the low resolution replica and, therefore, no supplemental information is available. Operational block 511 causes the tones of the four high resolution pixels in the super pixel substituted for the current low resolution pixel to be that of the current low resolution pixel, namely, $S_{k,n}=S_{k+1,n}=S_{k,n+1}=S_{k+1,n+1}=L_{i+1,j+1}$. Conditional branch point 512 tests to determine if the current low resolution pixel is in the last column of the low resolution replica (end of line). If the test result in step 512 is NO, operational block 513 causes the column counter for the low resolution replica to be incremented by 1 by setting $j=j+1$. Thereafter, control is returned to operational block 504 and steps 504 through 513 are iterated until an end of line is reached and the test in step 512 yields a YES result. Thereafter, conditional branch point 514 tests to determine whether the process is at the end of the image. If the test result in step 514 is YES, the process is stopped via stop step 518. If the test result in step 514 is NO, operational block 515 causes the low resolution replica line counter to be incremented by 1 by setting $i=i+1$. Then, operational block 516 causes the low resolution column counter to be set to $j=0$ and the high resolution line counter to be set to $k=2i+1$. Operational block 517 reinitializes the low resolution pixel, namely, by setting $L_{i,0}=$"0". Thereafter, control is again returned to operational block 504 and steps 504 through 517 are iterated until step 514 yields a YES result and we are at the end of an image. Then, the process is stopped by step 518.

Synthesizer processor 110 can also be implemented in software for use in a processor, e.g., a digital signal processor, or on a VLSI chip or the like, as desired.

The recomposed high resolution pixels are supplied from synthesizer processor 110 to output unit 111 which generates the desired high resolution image.

It is noted that the recomposition process effected in synthesizer processor 110 does not require the buffering of an entire frame of pixels as required in prior arrangements, but only requires the storing of the previous line of the low resolution replica and two current lines of the high resolution image. Consequently, less memory is required in the implementation of hard-copy facsimile terminals.

What is claimed is:

1. A method for decomposing a high resolution image into a low resolution replica and supplemental information for facsimile storage or transmission, comprising the steps of:

a. obtaining a super pixel, including a plurality of high resolution pixels, from a high resolution image source;

b. determining whether a low resolution pixel being generated from said super pixel is at an edge in a low resolution replica being generated, if so, generating supplemental information for said low resolution pixel being generated in accordance with first prescribed criteria dependent on said high resolution pixels in said super pixel and generating said low resolution pixel having a tone determined in accordance with second prescribed criteria, if not, determining whether said low resolution pixel being generated requires supplemental information and, if so, generating supplemental information for said low resolution pixel being generated in accordance with said first prescribed criteria and selecting the tone of said low resolution pixel being generated so that it is at an edge in said low resolution replica and, if not, generating said low resolution pixel having a tone determined in accordance with third prescribed criteria;

c. outputting said supplemental information, if any;

d. outputting a representation of said generated low resolution pixel tone;

e. obtaining a next super pixel from said high resolution image source as in step (a);

f. repeating steps (b) through (e) until the high resolution image has been decomposed to a low resolution replica plus supplemental information, if any.

2. The method as defined in claim 1 wherein said step of determining whether said low resolution pixel being generated is at an edge includes determining if at least one low resolution pixel adjacent to said low resolution pixel being generated has a tone different from the tone of said low resolution pixel being generated.

3. The method as defined in claim 1 wherein said step of determining whether said low resolution pixel being generated is at an edge includes a first step of comparing the tones of predetermined other low resolution pixels adjacent to said low resolution pixel being generated to each other to determine if said low resolution pixel being generated is at an edge, and if said first step of comparing yields a first predetermined result, determining that said low resolution pixel being generated is at an edge, and wherein said second prescribed criteria includes determining the tone of said low resolution pixel being generated in accordance with a predetermined relationship among the tones of the high resolution pixels in said super pixel.

4. The method as defined in claim 3 wherein said low resolution pixel being generated is located in a predetermined row and a predetermined column of the low resolution replica being generated and wherein said other adjacent low resolution pixels include a first low resolution pixel adjacent and prior in said predetermined row of the low resolution replica to said low resolution pixel being generated and a second low resolution pixel adjacent and prior in said predetermined column of the low resolution replica to said low resolution pixel being generated.

5. The method as defined in claim 4 wherein a white tone is defined by a first predetermined logical number and a black tone is defined by a second predetermined logical number, and wherein said predetermined relationship is measured by numerically summing logical numbers representing the tones of said high resolution pixels in said super pixel and comparing the sum to a predetermined value, and if the numerical sum of said logical numbers is greater than said predetermined value, the tone of said low resolution pixel being generated is selected to be a predetermined one of said white and black tones, and if the numerical sum of said logical numbers is less than said predetermined value, the tone of said low resolution pixel being generated is selected to be the other one of said white and black tones, and if the numerical sum of said logical numbers is equal to said predetermined value, tones of first predetermined ones of said high resolution pixels in said super pixel are compared to each other, and if they are the same as each other, the tone of said low resolution pixel being generated is selected to be the same as that of a first predetermined one of said other adjacent low resolution pixels, and if the tones of said first predetermined ones of said high resolution pixels are not the same as each other, tones of second predetermined ones of said high resolution pixels in said super pixel are compared to each other, and if they are the same as each other, the tone of said low resolution pixel being generated is selected to be the same as that of a second predetermined one of said other adjacent low resolution pixels, and if the tones of said second predetermined ones of said high resolution pixels are not the same as each other, the tone of said low resolution pixel being generated is selected to be white.

6. The method as defined in claim 3 wherein if said first step of comparing yields a second predetermined result, said step of determining further includes a second step of comparing the tone of a predetermined one of said other low resolution pixels adjacent to said low resolution pixel being generated to the tone of each of said high resolution pixels in said super pixel, and if they are all the same as each other, determining that said low resolution pixel being generated is not at an edge, and wherein said third prescribed criteria includes selecting the tone of said low resolution pixel being generated to be the same as that of said predetermined one of said other low resolution pixels adjacent to said low resolution pixel being generated, and wherein if said second comparing step indicates that the tone of said predetermined one of said other low resolution pixels adjacent to said low resolution pixel being generated is of a different tone from any of said high resolution pixels in said super pixel, determining that said low resolution pixel being generated must be forced to be at an edge, and wherein said second prescribed criteria includes selecting the tone of said low resolution pixel being generated to be opposite that of said predetermined one of said other low resolution pixels adjacent to said low resolution pixel being generated.

7. The method as defined in claim 3 wherein said first prescribed criteria includes generating said supplemental information to include representations of the tones of said plurality of high resolution pixels in said super pixel.

8. A method for recomposing a high resolution image from received low resolution pixel information from a low resolution replica and received supplemental information, comprising the steps of:

a. obtaining a low resolution pixel from the low resolution replica;

b. determining whether said obtained low resolution pixel is at an edge in the low resolution replica, if so, obtaining received supplemental information corresponding to said low resolution pixel and substituting said obtained supplemental information for said low resolution pixel to generate a high resolution super pixel in the high resolution image being recomposed, said high resolution super pixel including a plurality of high resolution pixels each having a tone determined from said supplemental information, if not, generating a high resolution super pixel in the high resolution image being recomposed, said high resolution super pixel including a plurality of high resolution pixels each having a tone the same as said low resolution pixel;

c. outputting said high resolution pixels of said super pixel;

d. obtaining a next low resolution pixel as in step (a);

e. repeating steps (b) through (d) until the high resolution image has been recomposed.

9. The method as defined in claim 8 wherein said step of determining includes a first step of comparing the tone of said obtained low resolution pixel to the tones of a predetermined number of low resolution pixels adjacent to said obtained low resolution pixel, and if said first step of comparing yields a first predetermined result, determining that said obtained low resolution pixel is at an edge, and if said first step of comparing yields a second predetermined result, determining that said obtained low resolution pixel is not at an edge.

10. The method as defined in claim 9 wherein said low resolution pixel is obtained from a predetermined row and a predetermined column of the received low resolution replica and wherein the number of said adjacent low resolution pixels is two and a first predetermined one of said low resolution pixels adjacent to said obtained low resolution pixel is a low resolution pixel adjacent and prior in said predetermined row of the low resolution replica to said obtained low resolution pixel and wherein a second predetermined one of said adjacent low resolution pixels is a low resolution pixel adjacent and prior in said predetermined column of the low resolution replica to said obtained low resolution pixel.

11. Apparatus for decomposing a high resolution image into a low resolution replica and supplemental information for facsimile storage or transmission comprising:
a source of a high resolution image having a first plurality of high resolution pixels;
means for obtaining super pixels in a predetermined sequence from said image source, each of said super pixels including a second plurality of high resolution pixels;
means for generating low resolution pixels to be substituted for corresponding ones of said super pixels;
means for determining whether each of said low resolution pixels being generated is at an edge in a low resolution replica being generated;
means for generating supplemental information in accordance with first prescribed criteria for each of said low resolution pixels being generated determined to be at an edge;
said means for generating said low resolution pixels including means for generating a tone for each of said low resolution pixels being generated determined to be at an edge in accordance with second prescribed criteria;
means for determining whether supplemental information is required for individual ones of said low resolution pixels being generated;
means for generating supplemental information for individual ones of said low resolution pixels being generated determined to require it in accordance with said first prescribed criteria;
means for selecting the tone of said individual ones of said low resolution pixels being generated which require said supplemental information so that they are at an edge in said low resolution replica;
means for generating a tone for each of said low resolution pixels being generated determined not to require supplemental information in accordance with third prescribed criteria;
means for outputting representations of the tones of said generated low resolution pixels; and
means for outputting said supplemental information, if any.

12. The apparatus as defined in claim 11 wherein said means for determining whether said low resolution pixels being generated are at edges includes means for determining, for each low resolution pixel being generated, if at least one low resolution pixel adjacent to said low resolution pixel being generated has a tone different from the tone of said low resolution pixel being generated.

13. The apparatus as defined in claim 11 wherein said means for determining includes first means for comparing the tones of predetermined other low resolution pixels adjacent to a low resolution pixel being generated to each other to determine if said low resolution pixel being generated is at an edge, and if said first means for comparing generates a first predetermined result, determining that said low resolution pixel being generated is at an edge, and wherein said first means for generating a tone includes means for selecting the tone of said low resolution pixel being generated in accordance with said second prescribed criteria, said second prescribed criteria being based on a prescribed relationship of the tones of said high resolution pixels in a super pixel corresponding to said low resolution pixel being generated to each other.

14. The apparatus as defined in claim 13 wherein said low resolution pixel being generated is located in a predetermined row and a predetermined column of the low resolution replica being generated and wherein said other adjacent low resolution pixels include a first low resolution pixel adjacent and prior in said predetermined row to said low resolution pixel being generated and a second low resolution pixel adjacent and prior in said predetermined column to said low resolution pixel being generated.

15. The apparatus as defined in claim 14 wherein a white tone is defined by a first predetermined logical number and a black tone is defined by a second predetermined logical number, and wherein said predetermined relationship is measured by numerically summing logical numbers representing the tones of said high resolution pixels in said super pixel and comparing the sum to a predetermined value and, if the numerical sum of said logical numbers is greater than said predetermined value, the tone of said low resolution pixel being generated is selected to be a predetermined one of said white and black tones, and if the numerical sum of said logical numbers is less than said predetermined value, the tone of said low resolution pixel being generated is selected to be the other one of said white and black tones, and if the numerical sum of said logical numbers is equal to said predetermined value, tones of first predetermined ones of said high resolution pixels in said super pixel are compared to each other, and if they are the same as each other, the tone of said low resolution pixel being generated is selected to be the same as that of a first predetermined one of said other low resolution pixels adjacent to said low resolution pixel being generated, and if the tones of said first predetermined ones of said high resolution pixels are not the same as each other, tones of second predetermined ones of said high resolution pixels in said super pixel are compared to each other, and if they are the same as each other, the tone of said low resolution pixel being generated is selected to be the same as that of a second predetermined one of said other low resolution pixels adjacent to said low resolution pixel being generated, and if the tones of said second predetermined ones of said high resolution pixels are not the same as each other, the tone of said low resolution pixel being generated is selected to be white.

16. The apparatus as defined in claim 13 wherein said means for determining further includes second means responsive to a second predetermined result from said first means for comparing a tone of a predetermined one of said other low resolution pixels adjacent to said low resolution pixel being generated to each of the tones of said high resolution pixels in said super pixel and if they are all the same as each other, determining that said low resolution pixel being generated is not at an edge, and wherein said third prescribed criteria includes selecting the tone of said low resolution pixel being generated to be the same as that of said predetermined one of said other low resolution pixels adjacent to said low resolution pixel being generated, and wherein if said second means for comparing indicates that the tone of said predetermined one of said other low resolution pixels adjacent to said low resolution pixel being generated is different from any of said high resolution pixels in said super pixel, determining that said low resolution pixel being generated must be forced to be at an edge, and wherein said second criteria includes selecting the tone of said low resolution pixel being generated to be opposite that of said predetermined one of said other low resolution pixels adjacent to said low resolution pixel being generated.

17. The apparatus as defined in claim 13 wherein said first prescribed criteria includes generating said supplemental information to include representations of the tones of said plurality of high resolution pixels in said super pixel.

18. Apparatus for recomposing a high resolution replica from received low resolution pixel information from a low resolution replica and received supplemental information comprising:

means for obtaining low resolution pixels from the received low resolution replica;

means for determining whether individual ones of said obtained low resolution pixels are at an edge in said low resolution replica;

means for obtaining supplemental information for individual ones of said low resolution pixels determined to be at an edge and for substituting said supplemental information for said low resolution pixel at an edge to generate a high resolution super pixel in the high resolution image being recomposed, said high resolution super pixel having a plurality of high resolution pixels, each having a tone determined from said supplemental information;

means for generating a high resolution super pixel for each low resolution pixel not at an edge, said high resolution super pixel having a plurality of high resolution pixels, each of said high resolution pixels having a tone the same as that of a corresponding low resolution pixel; and means for outputting said high resolution pixels.

19. The apparatus as defined in claim 18 wherein said means for determining includes a first means for comparing the tone of said obtained low resolution pixel to the tones of a predetermined number of adjacent low resolution pixels, and if said first means for comparing yields a first predetermined result, determining that said obtained low resolution pixel is at an edge, and if said first means for comparing yields a second predetermined result, determining that said obtained low resolution pixel is not at an edge.

20. The apparatus as defined in claim 19 wherein said low resolution pixel is obtained from a predetermined row and a predetermined column of the received low resolution replica and wherein the number of said adjacent low resolution pixels is two and said first predetermined adjacent low resolution pixel is a low resolution pixel adjacent and prior in said predetermined row to said obtained low resolution pixel and wherein said second predetermined adjacent pixel is a low resolution pixel adjacent and prior in said predetermined column to said obtained low resolution pixel.

21. The apparatus as defined in claim 20 further including an output unit supplied with said high resolution pixels.

* * * * *